(12) United States Patent
Ogirko et al.

(10) Patent No.: US 9,146,650 B2
(45) Date of Patent: Sep. 29, 2015

(54) HIGH RESOLUTION CAPACITANCE TO CODE CONVERTER

(71) Applicant: Cypress Semiconductor Corporation, San Jose, CA (US)

(72) Inventors: Roman Ogirko, Lviv (UA); Hans Klein, Pleasanton, CA (US); Andriy Maharyta, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/475,034

(22) Filed: Sep. 2, 2014

(65) Prior Publication Data

US 2015/0084918 A1    Mar. 26, 2015

Related U.S. Application Data

(63) Continuation of application No. 14/097,138, filed on Dec. 4, 2013, now Pat. No. 8,836,669.

(60) Provisional application No. 61/877,773, filed on Sep. 13, 2013, provisional application No. 61/890,622, filed on Oct. 14, 2013.

(51) Int. Cl.
*G09G 5/00* (2006.01)
*G06F 3/041* (2006.01)
*G06F 3/044* (2006.01)
*G06F 7/38* (2006.01)

(52) U.S. Cl.
CPC .............. *G06F 3/044* (2013.01); *G06F 3/0416* (2013.01)

(58) Field of Classification Search
USPC ......... 324/676, 658, 649, 600, 686, 665, 672, 324/679, 519, 548, 76.66, 76.11; 345/156, 345/173, 174, 179; 178/18.06, 19.03; 326/38, 41, 47
See application file for complete search history.

(56) References Cited

PUBLICATIONS

U.S. Appl. No. 14/097,138: "High Resolution Capacitance to Code Converter" Roman Ogirko et al., filed on Dec. 4, 12013; 40 pages.
International Search Report for International Application No. PCT/US2013/076596 dated Mar. 21, 2014; 2 pages.
USPTO Non Final Rejection for U.S. Appl. No. 14/097,138 dated Mar. 7, 2014; 8 pages.
USPTO Notice of Allowance for U.S. Appl. No. 14/097,138 dated May 30, 2014; 8 pages.
USPTO Notice of Allowance for U.S. Appl. No. 14/097,138 dated Jul. 7, 2014; 8 pages.
Written Opinion of the International Searching Authority for International Application No. PCT/US2013/076596 dated Mar. 21, 2014; 6 pages.

*Primary Examiner* — Kent Chang
*Assistant Examiner* — Nelson Rosario
(74) *Attorney, Agent, or Firm* — Morgan, Lewis & Bockius LLP

(57) ABSTRACT

An integration circuit including a first capacitor is operatively coupled to a comparator. The comparator is configured to compare a first capacitor voltage of the first capacitor to a reference voltage and produce a first comparator output based on the comparison. A current generator is operatively coupled with the integration circuit and configured to balance charge on the first capacitor. A control unit is operatively coupled to the comparator and the current generator and configured to balance charge on the first capacitor by sensing the first comparator output and controlling the current generator based on the first comparator output.

20 Claims, 7 Drawing Sheets

HIGH RESOLUTION CAPACITANCE TO CODE CONVERTER

This application is a continuation of U.S. patent application Ser. No. 14/097,138, filed Dec. 4, 2013, which claims the benefit of U.S. Provisional Patent Application No. 61/877,773, filed on Sep. 13, 2013, and of U.S. Provisional Patent Application No. 61/890,622, filed on Oct. 14, 2013, all of which are hereby incorporated by reference in their entirety.

TECHNICAL FIELD

The present disclosure relates generally to sensing systems, and more particularly to capacitance-sensing systems configurable to determine locations of touches on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
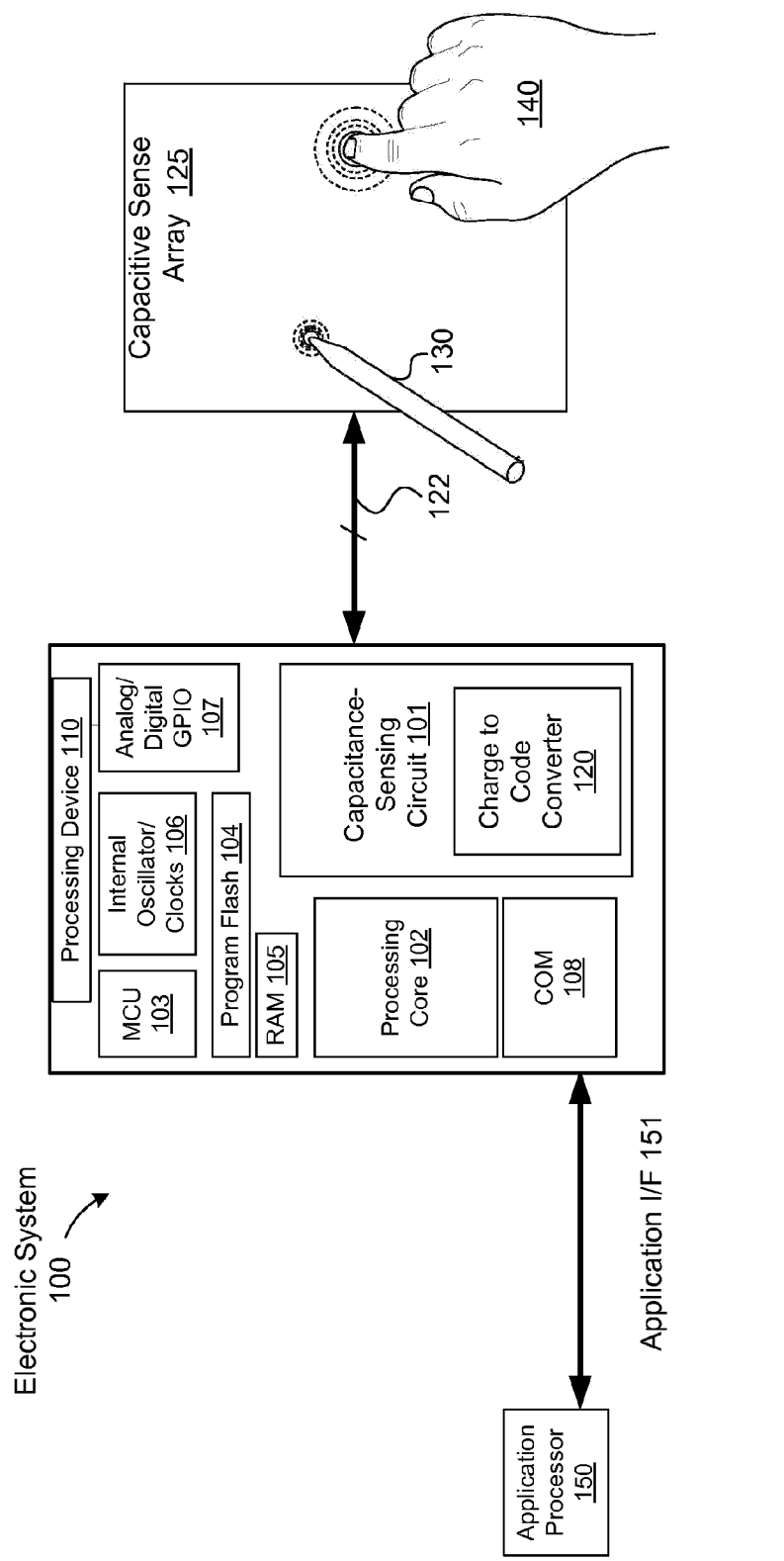
FIG. 1 is a block diagram illustrating one embodiment of an electronic system having a processing device, including an charge to code converter.

FIG. 1 is a block diagram illustrating one embodiment of an electronic system having a processing device, including an charge to code converter. Details regarding the charge to code converter 120 are described in more detail with respect to FIGS. 2-7. The processing device 110 is configured to detect one or more touches detected proximate to a touch-sensing device, such as capacitive sense array 125. The processing device 110 can detect conductive objects, such as touch objects 140 (fingers or passive styluses, an active stylus 130, or any combination thereof). The capacitance-sensing circuit 101 can measure touch data created by a touch using the capacitive sense array 125. The touch may be detected by a single or multiple sensing cells, each cell representing an isolated sense element or an intersection of sense elements (e.g., electrodes) of the capacitive sense array 125. In another embodiment, the touch data is used to generate a 2D capacitive image of the capacitive sense array 125. In one embodiment, when the capacitance-sensing circuit 101 measures mutual capacitance of the touch-sensing device (e.g., using capacitive sense array 125), the capacitance-sensing circuit 101 acquires a 2D capacitive image of the touch-sensing object and processes the data for peaks and positional information. In another embodiment, the processing device 110 is a microcontroller that obtains a capacitance touch signal data set from application processor 150, such as from capacitive sense array 125, and finger detection firmware executing on the microcontroller identifies data set areas that indicate touches, detects and processes peaks, calculates the coordinates, or any combination therefore. The microcontroller can report the precise coordinates to an application processor, as well as other information.

Electronic system 100 includes processing device 110, capacitive sense array 125, stylus 130, and application processor 150. The capacitive sense array 125 may include capacitive sense elements that are electrodes of conductive material, such as copper. The sense elements may also be part of an indium tin oxide (ITO) panel. The capacitive sense elements can be used to allow the capacitance-sensing circuit 101 to measure self-capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the multi-dimension sense array operates as an all-points-addressable ("APA") mutual capacitive sense array. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown)(e.g., field-programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the charge to code converter 120. Additional details of the charge to code converter 120 are described below with respect to FIGS. 2-7.

Processing device 110 may include internal oscillator/clocks 106 and communication block ("COM") 108. In another embodiment, the processing device 110 includes a spread-spectrum clock (not shown). The oscillator/clocks block 106 provides clock signals to one or more of the components of processing device 110. Communication block 108 may be used to communicate with an external component, such as an application processor 150, via application interface ("I/F") line 151.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the capacitance on the sensing device and sends the raw data to a host computer where it is analyzed by an application. In effect, the processing that is done by processing device 110 may also be done in the application processor.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2:
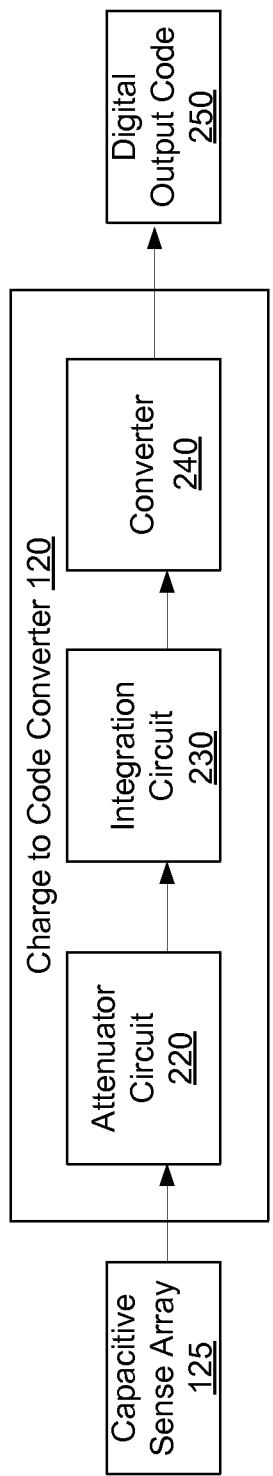
FIG. 2 is a block diagram of a charge to code converter, according to one embodiment.

FIG. 2 is a block diagram of a charge to code converter, according to one embodiment. The charge to code converter 120 includes an attenuator circuit 220, an integration circuit 230, and a converter 240. In one embodiment, the converter 240 is a charge-balancing converter as described herein. Alternatively, other circuits can be used to convert an input signal into a digital value. The charge to code converter 120 may be part of a touchscreen controller coupled to an indium-tin-oxide (ITO) panel (or other sense array, like capacitive sense array 125, described above). The touch screen controller measures input current from the capacitive sense array 125 and based on input current, calculates the touch position. The signals received from the capacitive sense array 125 can be attenuated by the attenuator circuit 220 before being input into the integration circuit 230. The integration circuit 230 integrates the attenuated signal and inputs the resulting signal into the converter 240. The converter 240 converts the integrated signal into a digital value, for example digital output code 250. This digital value can be processed further by the processing device 110 or the application processor 150. The digital value represents a capacitance measured on the capacitive sense array 125 for purposes of detecting touches on the capacitive sense array 125 by one or more conductive objects, as well as positions of the touches, gestures by conductive objects, or the like.

Figure 3:
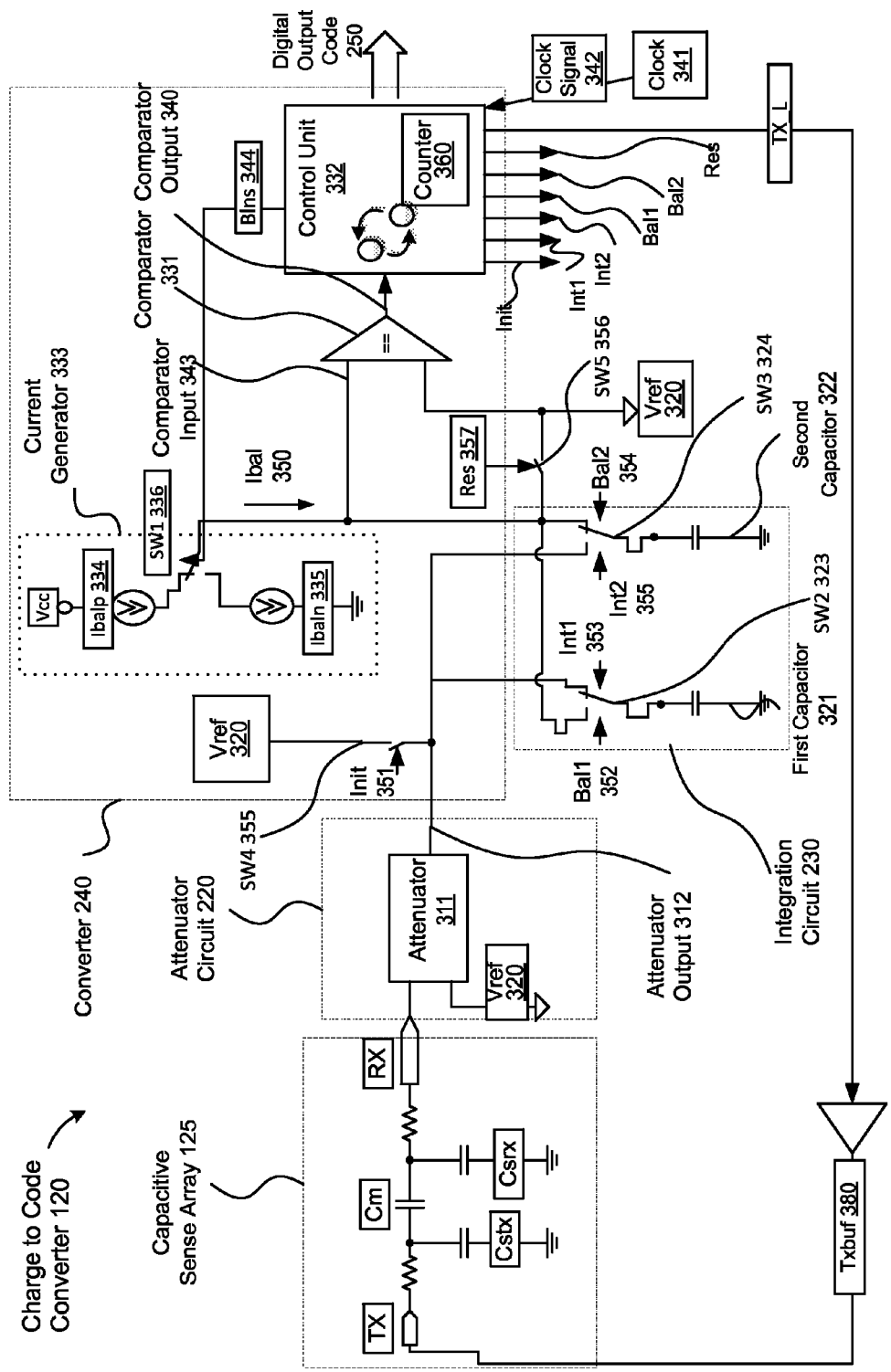
FIG. 3 is a diagram of a charge to code converter, according to another embodiment.

FIG. 3 is a diagram of a charge to code converter, according to another embodiment. Charge to code converter 120 includes an attenuator circuit 220, an integration circuit 230, and a converter 240. Attenuator circuit 220 receives a signal from capacitive sense array 125. Attenuator circuit 220 attenuates the signal to produce an attenuated output charge at an attenuator output 312. The attenuated output charge is integrated at a first capacitor 321 (i.e., integrate/sample), creating a first capacitor voltage. In a second step the first capacitor 321 is switched from position Int1 353 to Bal1 352 in order to disconnect the first capacitor 321 from attenuator circuit 220, and connect the first capacitor 321 to comparator 331. At comparator 331, the first capacitor voltage of the first capacitor 321 is compared to a reference voltage (Vref 320). Comparator 331 produces a first comparator output at comparator output 340 based on the comparison. The control unit 332 receives the first comparator output from comparator 331. In response, the control unit 332 signals the current generator 333 to either charge or discharge (i.e., balance) the first capacitor 321. In one embodiment, the charge balancing period is the length of time a capacitor is charged or discharged. For example, the control unit 332 measures the time the current generator 333 charges or discharges the first capacitor 321 to an original voltage (i.e., a charge balancing period). The charge balancing period can be measured by counter 360 and converted to a digital output code 250. In one embodiment, counter 360 may be part of control unit 332.

In one embodiment, the charge-balancing is achieved in two phases. In a first phase (e.g., sampling phase) an attenuated output charge from attenuator output 312 is stored on a first capacitor 321. In a second phase (e.g., balancing phase), the first capacitor 321 is rebalanced (e.g., first capacitor 321 to position Bal1 352) to its original value using a constant current source (e.g., current generator 333).

In another embodiment, integration circuit 230 contains a first capacitor 321 and a second capacitor 322. Charge to code converter 120 is configured to alternately integrate charge (i.e., sample) on one of the first capacitor 321 or second capacitor 322 while balancing charge on the other of the first capacitor 321 or second capacitor 322. The charge balancing period is measured for each of the first capacitor 321 and the second capacitor 322. Counter 360 converts the charge balancing period into a digital output code 250.

In an embodiment, charge to code converter 120 can be said to comprise of two converters. For example, a first converter (e.g., using a first capacitor 321) samples an attenuated signal from attenuator circuit 220 in one phase, while the second converter balances a previously sampled charge on second capacitor 322, and vice versa (i.e., ping-pong operation). The dual nature of the charge to code converter 120 allows for continuous integration of an input signal, for example attenuated signal from attenuator circuit 220. Ping-pong operation is advantageous for narrow receiver bandwidth, and offers much improved noise rejection over a single-converter implementation.

In another embodiment, attenuator circuit 220 charges the integrating capacitors, first capacitor 321 or second capacitor 322, for rising and falling excitation signals edges separately. Such a configuration allows for the "time sharing" of circuit resources during the acquisition and balance of input signals (e.g., signals from capacitive sense array 125). A balancing circuit contains current generator 333 having two current sources (e.g., Ibalp 334 and Ibaln 335), and switch SW1 336. Switch SW1 336 is controlled by the control unit 332. The balancing current direction (sourcing or sinking) of current generator 333 is defined by the output of comparator 331 at the outset of the balancing phase and controlled by control unit 332. The charge balancing period stops after the comparator changes its state, synchronously latched by the system clock, e.g., clock 341.

In one embodiment, the input signal from attenuator circuit 220 to the integration circuit 230 is provided by a programmable current-mode attenuator circuit, delivering an incoming charge signal onto an integrating (e.g., sampling) capacitor (e.g., the first capacitor 321). The combination of a current-mode signal from attenuator circuit 220 stored onto a capacitor (e.g., first capacitor 321) forms an integrator. Making attenuator circuit 220 programmable provides for an adaptive mechanism to deal with small and large signals from capacitive sense array 125. By attenuating large input signals, charge to code converter 120 can implement physically small integrating capacitors (e.g., first capacitor 321 and second capacitor 322), decreasing the physical RX channel size significantly, thus reducing cost.

In another embodiment, charge-balancing allows the integration circuit 230 to use nonlinear capacitors, such as capacitors based on MOS gate-oxide capacitance. Capacitors based on such MOS capacitance are typically much smaller than linear (e.g., metal-metal) capacitors, and results in further die-size reduction.

In one embodiment, the programmable attenuator, for example, attenuator circuit 220, scales an incoming current from capacitive sense array 125. The output of attenuator circuit 220 behaves like a current source, which by definition is a circuit delivering the expected output current regardless of the voltage at its output (i.e., a high output impedance circuit). Such current-mode output allows the attenuator circuit 220 to be used as part of an active integrator. That is, the attenuator circuit 220 can charge a capacitance (e.g., the first capacitor 321 and second capacitor 322) with current, which is equivalent to a capacitor charged by an opamp-based integrator, but without the need for an opamp, thus saving area and power.

In another embodiment, charge to code converter 120 allows for the accumulation of the quantization error of each individual conversion to carrying over to the next conversion (e.g., accumulating a quantization error over successive charge balancing periods). Accumulating quantization error allows charge to code converter 120 to increase converter resolution proportional to total conversion time (i.e., the sum of all previous conversions, until eventually the converter system is reset).

In one embodiment, residual error of an individual charge-balancing action is accumulated on the integration capacitor (e.g., first capacitor 321 and second capacitor 322), rather than reset (e.g., to "zero" or reference voltage 320), as is typically done with conventional converters. By not resetting the capacitor (e.g., first capacitor 321 and second capacitor 322), the residual charge balancing error from a previous conversion is retained and thus added to the next signal sample. Thus, previous conversion (balancing) errors are never lost, and get taken care of in the balancing process during subsequent samples. Only the very last balancing error remains uncorrected. Thus, the accumulation technique equates to a single conversion error out rather than the sum of all previous conversion errors. This translates into a small LSB error, such as one count out of 10,000.

In one embodiment, the balancing duration (e.g., charge balancing period) is synchronized with the system clock (e.g., clock 341). As a result, the current generator 333 generates a certain constant charge packet for every clock period; which is equivalent to a quantization step (i.e., an LSB). The charge-balancing period stops when the comparator input crosses the reference voltage. In practice, the balancing period may be one count too long. This means that the balancing current does not perfectly balance the charge on the first capacitor 321 or second capacitor 322, and leaves a small error. Thus, at the end of balancing, the integrating capacitor (e.g., first capacitor 321 and second capacitor 322) stores a residual charge which is the difference between the incoming charge and quantized balancing charge. Then, at the next conversion cycle, the integration circuit 230 collects a new incoming charge plus the previous quantization error. In other words, every following conversion contains a quantization error from the previous conversion. Thus, subsequent conversions will eventually make up for the sum of all previous quantization errors, except for the very last conversion. This means that charge to code converter 120 will have a quantization error of typically just 1 count (1 LSB). The longer the total number of subsequent conversions, the larger the total signal count. If there is only one LSB error for the full conversion count, then the effective quantization error becomes smaller the larger the total count. For example, if the total signal count amounts to ~1,000, then 1 count of 1,000 amounts to the equivalent of a 10 bit converter (2^10=1024). But when accumulating twice as many samples, the total count reaches ~2,000, but still with just one count error. Thus, 1 count of 2,000 amounts to an 11 bit conversion (2^11=2048). In one embodiment, quantization error accumulation of charge to code converter 120 allows the converter resolution to increase proportionally to total accumulation time.

In one embodiment, the charge balancing period is measured by a counter 360, such as a high-speed counter (e.g. using 48 MHz system clock). In one embodiment, any subsequent conversions can be added up (accumulated) so as to form one major data point. As a typical example, charge to code converter 120 collects samples from 50 TX (i.e., transmission) cycles (thus 100 edges), all accumulated in a single total count, for example, 10,000.

In another embodiment, converter 240 includes two comparators (not shown). This configuration may be called the "dual-comparator" approach. In the dual comparator approach, each of the two comparators is coupled to one of the capacitors of integration circuit 230. For example, a first comparator operates for first capacitor 321 and a second comparator operates for second capacitor 322. In the dual-comparator approach, some of the parasitic effects on the input node of a comparator are reduced when the respective capacitors (e.g., first capacitor 321 and second capacitor 322) are balanced.

In should be noted that in one embodiment presented in FIG. 3, capacitive sense array 125 is represented by an equivalent circuit that, for illustration, mimics the RX and TX lines resistances and self-capacitances (Rrx, Crx, Rtx and Ctx, respectively) of an actual sensor panel. Additionally, control unit 332 forms all control signals in the converter and also generates the excitation signal TX. Control unit 332 is synchronized by the system clock, e.g., clock 341.

Figure 4:
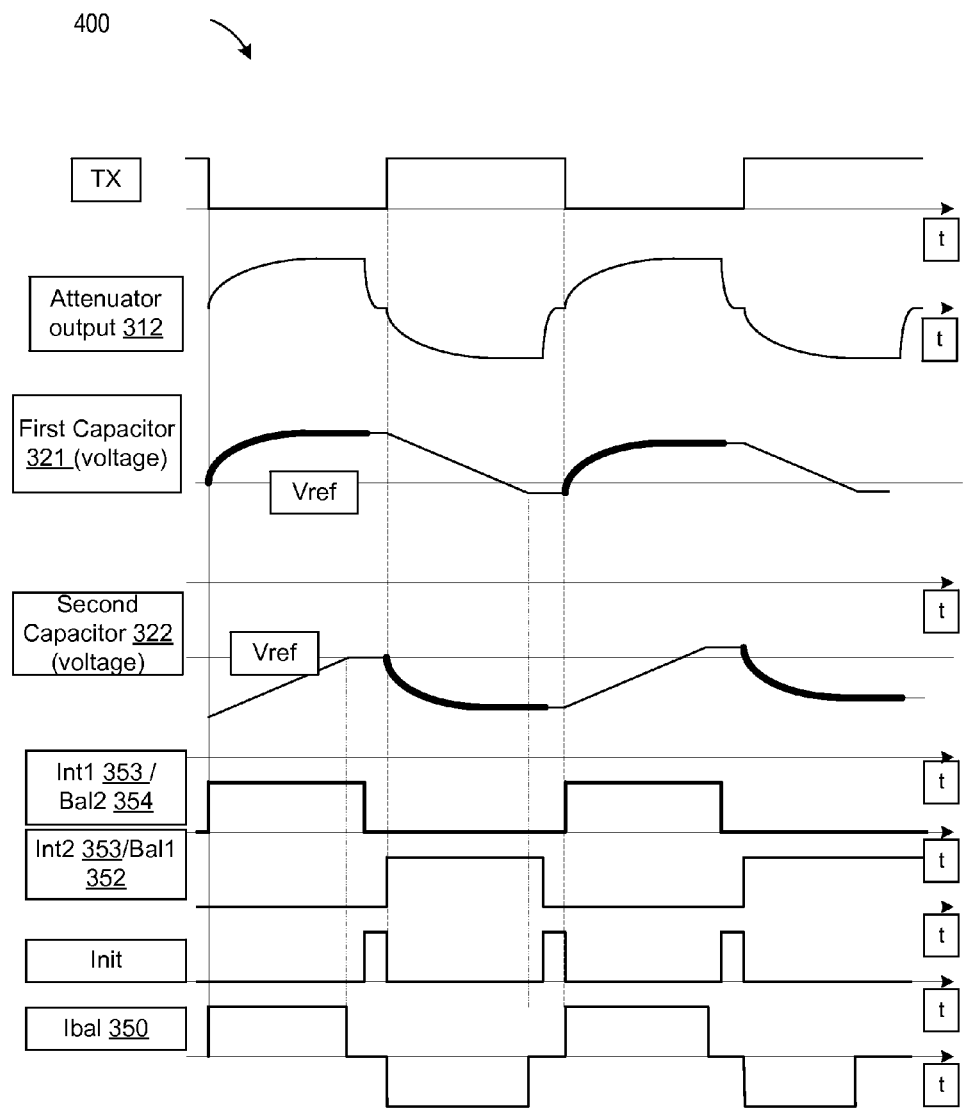
FIG. 4 is a diagram illustrating signal waveforms of a charge to code converter circuit, according to one embodiment.

FIG. 4 is a diagram illustrating signal waveforms of a charge to code converter circuit, according to one embodiment. The two integrating capacitors, first capacitor 321 and second capacitor 322, are connected to the attenuator output 312 or to the comparator input 343, sequentially. The two switches, SW2 323 and SW3 324, are toggling the two integrating capacitors (e.g., first capacitor 321 and second capacitor 322) between the attenuator output 312 and comparator input 343. The toggling is controlled by signal Bal1 352, Bal2 354, Int1 353 and Int2 354 coming from a state machine of the control unit 332. Intx (e.g., Int1 353 and Int2 355) represents a signal for which the capacitor (e.g., first capacitor 321 and second capacitor 322) is connected to the attenuator output 312. The Balx (e.g., Bal1 352 and Bal2 354) represents a signal for which the capacitor (e.g., first capacitor 321 and second capacitor 322) is connected to comparator input 343. The signals Bal1 352 and Int2 355 are in phase. The signals Bal2 354 and Int1 353 are in an opposite phase to that of Bal1 352 and Int2 355. The different phases of integration and balancing allow the charge to code converter 120 to separate the processes of integrating and balancing. The different phases allow the charge to code converter 120 to perform balancing without incoming noise from the sensor.

In one embodiment, the integrating capacitors (e.g., first capacitor 321 and second capacitor 322) are connected to attenuator output 312 synchronous to a corresponding TX (i.e., transmission) edge and disconnected from the attenuator output 312 before a following TX edge. The bold part of the voltage waveforms for the integrating capacitors (i.e., first capacitor 321 and second capacitor 322) depict the interaction of these capacitors (i.e., first capacitor 321 and second capacitor 322) with the attenuator output 312 during charge integration.

In one embodiment, the balancing current direction of Ibal 350 is directly dependent on the comparator state (e.g., comparator 331). The balancing current is controlled by signal Blns 344 from control unit 332.

In one embodiment, charge to code converter 120 contains two switches, SW4 355 and SW5 356, that connect the attenuator output 312 and comparator input 343 to the reference voltage source (i.e., Vref 320). The control of SW4 355 and SW5 356 is performed by control unit 332 with signals Res 357 and Init 351. Switch SW4 355 on the attenuator output 312 is dedicated to prevent charge sharing between the attenuator circuit 220 and integrating capacitor (e.g., first capacitor 321 and second capacitor 322) after toggling the capacitors (e.g., first capacitor 321 and second capacitor 322). In normal operation, the capacitor (e.g., first capacitor 321 and second capacitor 322) connected to comparator 331 is nearly completely discharged. However, the voltage at attenuator output 312 differs from the reference voltage (Vref 320) at the TX pulse end.

In one embodiment, attenuator output 312 has a parasitic capacitance to ground. Consequently, voltage at the attenuator output 312 does not change after disconnecting the integrating capacitor (e.g., first capacitor 321 and second capacitor 322). Attenuator output 312 is connected to the reference voltage (i.e. Vref 320) for a short time to discharge the parasitic capacitance. Consequently, charge on the parasitic capacitance at the attenuator output 312 is constant after every conversion. A subsequent conversion is not disturbed by a charge remaining on the parasitic capacitance from a previous conversion. In another embodiment, the duration of signal Init 351 can be used to reduce the integration time, resulting in a change of the channel frequency response.

In one embodiment, the second switch, SW5 356 (controlled by signal Res 357), optionally allows charge to code converter 120 to change converter behavior when an overload occurs. Overload means a situation when the balancing duration is longer than the TX half-period. In an overload case, the integrating capacitor (e.g., first capacitor 321 and second capacitor 322) contains a charge after the balancing period is stopped but before the following TX edge. In another embodiment, overload occurs when an external noise charges the integrating capacitor.

When overload occurs, at least two options of operation of charge to code converter 120 are available, in one embodiment. In one embodiment, the integrating capacitor (e.g., first capacitor 321 and second capacitor 322) of the charge to code converter 120 is never reset (i.e., balancing option A). In another embodiment, the integrating capacitor (e.g., first capacitor 321 and second capacitor 322) of the charge to code converter 120 is tested after an overload situation (i.e., balancing option B) and reset based on a detected overload.

Figure 5:
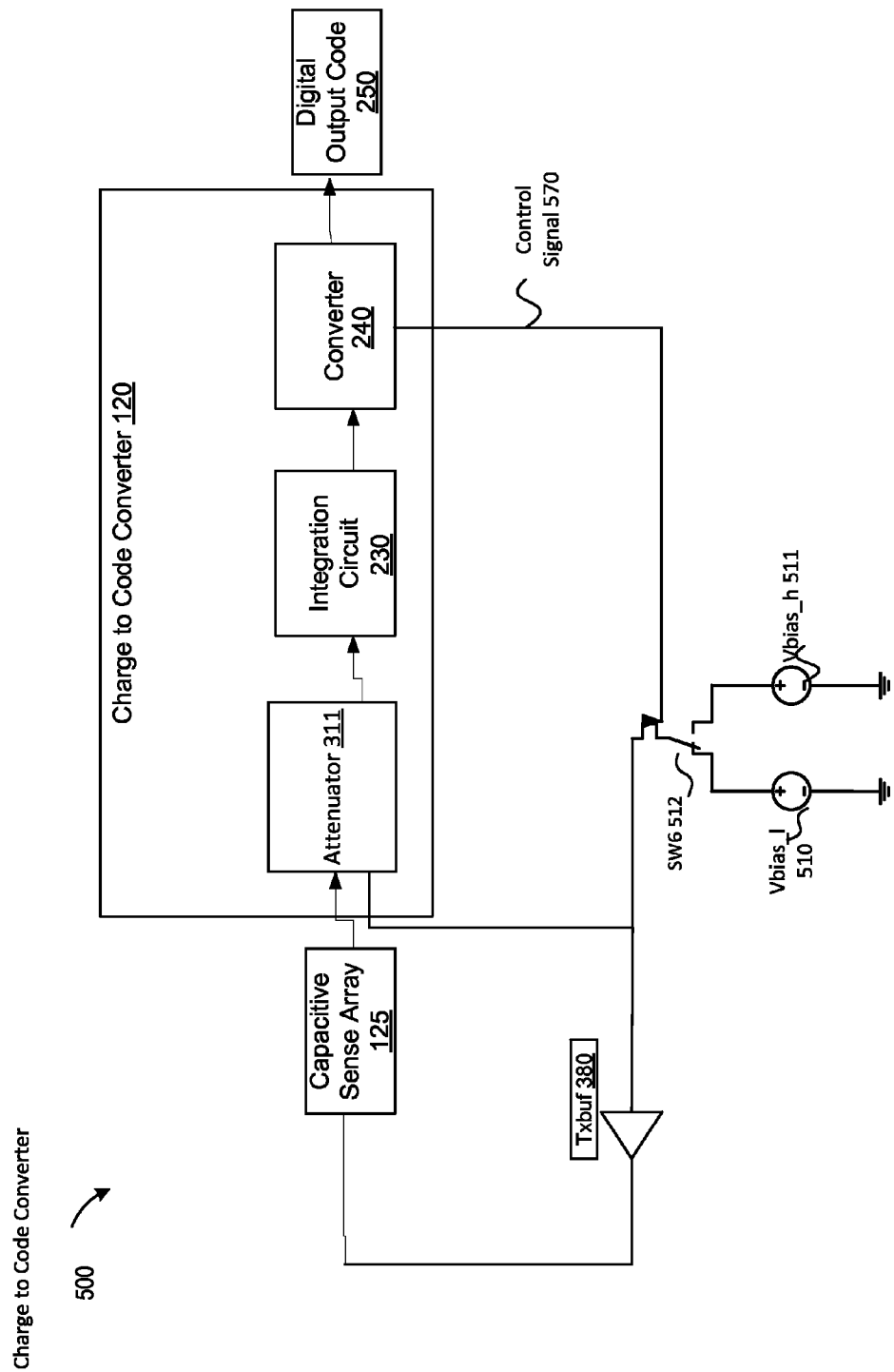
FIG. 5 is a diagram of a charge to code converter, according to another embodiment.

FIG. 5 is a diagram of a charge to code converter, according to another embodiment. Charge to code converter 500 has been configured to allow for the measuring of sensor self-capacitance (e.g., capacitive sense array 125). The charge to code converter 120 is supplemented with two voltage sources (Vbias_1 510, Vbias_h 511) and switch SW6 512. Switch SW6 512 is controlled by the excitation control signal (e.g., control signal 570) and toggles between the two voltage sources (i.e., Vbias_1 510 and Vbias_h 511). The switching of SW6 512 modulates the attenuator circuit 220 with a swing equal to Vbias_h 511 less Vbias_l 510. Every edge of the modulation (i.e., control signal 570) leads to a recharging of the sensor self-capacitance (e.g., of capacitive sense array 125). The recharging current is mirrored at the attenuator output stage (e.g., attenuator output 312). The attenuator output current charges the integrating capacitor (e.g., first capacitor 321 and second capacitor 322) with charge that is proportional to charge variation in the sensor (e.g., capacitive sense array 125). After the sensor recharging, the integrating capacitor (e.g., first capacitor 321 and second capacitor 322) is rebalanced by the balancing current. In one embodiment, the switching and balancing of the integrating capacitors (e.g., first capacitor 321 and second capacitor 322) is the same operation that was described previously in FIGS. 3 and 4.

In one embodiment, the attenuator modulation voltage (i.e., Vbias_l 510 and Vbias_h 511) transfers through the TX buffer (i.e., Txbuf 380, an element with unity gain, note that the TX buffer may be called a Shield Buffer) to the sensor TX electrodes (e.g., of capacitive sense array 125). The configuration creates the same voltage on both sides of the sensor's (e.g., capacitive sense array 125) mutual capacitances and excludes the mutual capacitance values from being charged. The sensing capacitance of capacitive sense array 125 is significantly reduced and side effects of sensor mutual capacitance variation are removed.

Figure 6:
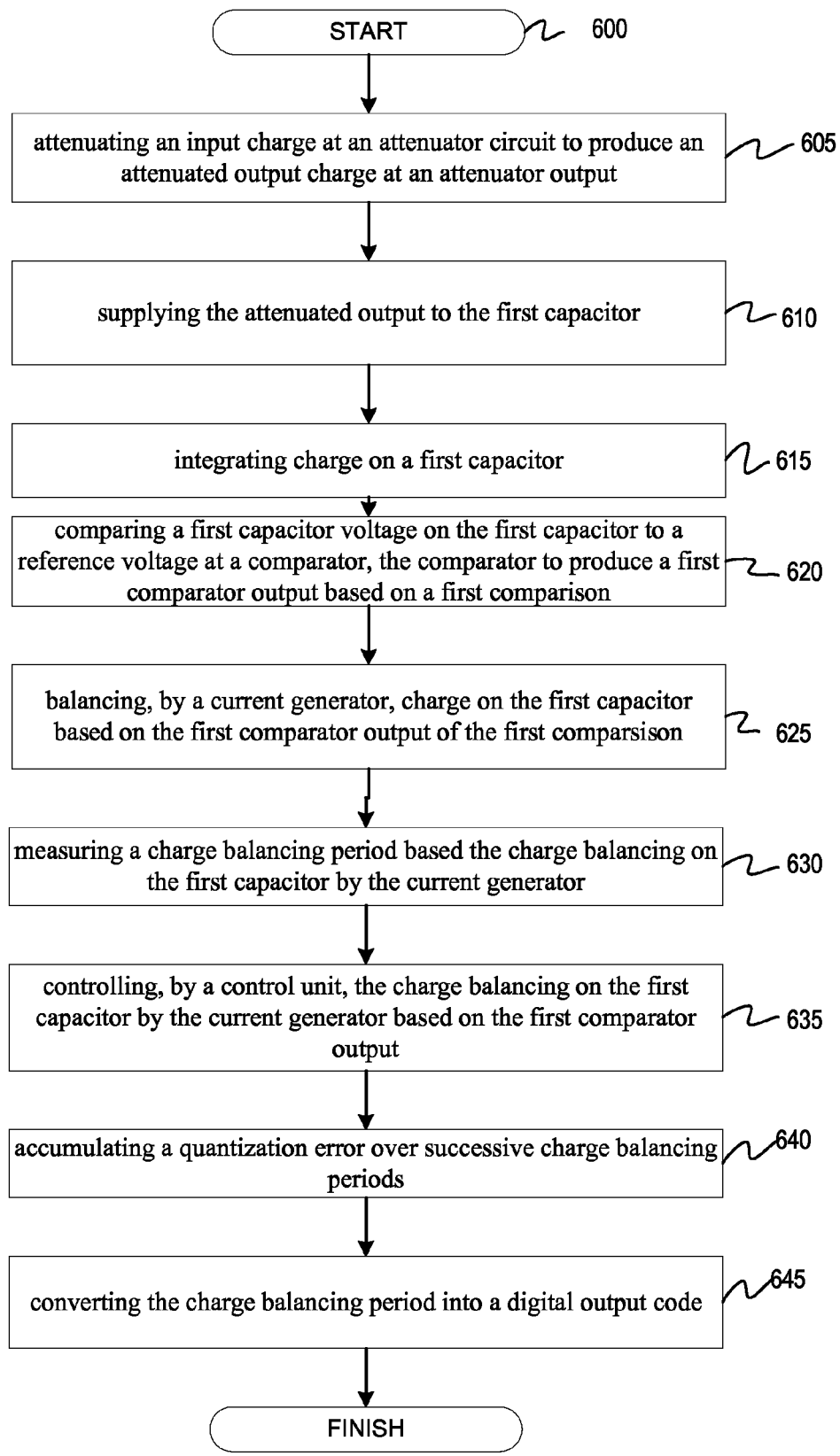
FIG. 6 is a flow diagram of a method of charge to code conversion, according to an embodiment.

FIG. 6 is a flow diagram of a method 600 of charge to code conversion, according to one embodiment. The method 600 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 600. In another embodiment, the charge to code converter 120 performs method 600. Alternatively, other components of the electronic system 100 perform some or all of the operations of method 600.

Method 600 begins at block 605 wherein an attenuator circuit 220 attenuates an input charge from for example, capacitive sense array 125, to produce an attenuated output charge at the attenuator output 312, according to one embodiment. Method 600 continues to block 610 by supplying the attenuated output charge to first capacitor 321. In block 615 of method 600, first capacitor 321 integrates the attenuated output charge from attenuator 311. In block 620 of method 600, the first capacitor voltage on the first capacitor 321 is compared to a reference voltage (e.g., Vref 320) at comparator 331 to produce a first comparator output based on a first comparison. First capacitor 321 is switched from the attenuator output 312 to comparator input 343 by switch SW2 323. In block 625 of method 600, the current generator 333 balances charge on the first capacitor 321 based on the first comparator output of the first comparison. Current generator 333 may either sink charge or source charge. Control unit 332 controls current generator 333 based on the output of comparator 331. In block 630 of method 600, control unit 332 measures a charge balancing period based on the charge balancing on the first capacitor 321 by the current generator 333. In block 635 of method 600, the control unit 332 controls the charge balancing on the first capacitor 321 by current generator 333, by control signal, Blns 344. The control unit 332 controls the current generator 333 based on the first comparator output of comparator 331. In block 640 of method 600, a quantization error is accumulated over successive charge balancing periods on the integration capacitors (e.g., first capacitor 321 and second capacitor 322). In in block 645 of method 600, the charge balancing period is converted into a digital output code 250. The charge balancing period is counted by a high-speed counter, for example counter 360.

In one embodiment, the method 600 may be used with two integrating capacitors (e.g., first capacitor 321 and second capacitor 322). Charge to code converter 120 may alternately integrate charge on one of the first capacitor 321 or the second capacitor 322 while balancing charge on another of the first capacitor 321 or the second capacitor 322.

Figure 7:
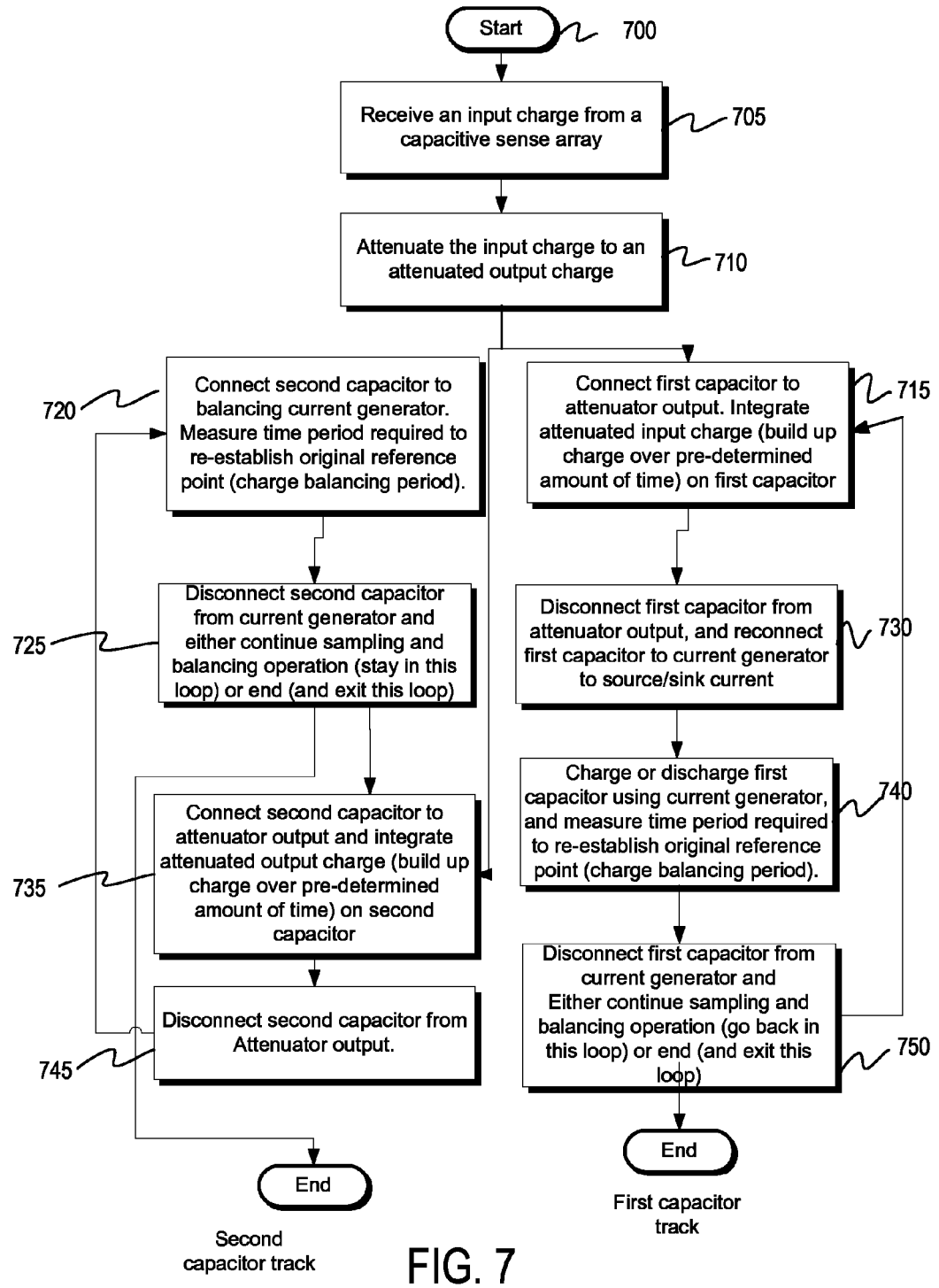
FIG. 7 is a flow diagram of a method of charge to code conversion, according to another embodiment.

FIG. 7 is a flow diagram of a method of charge to code conversion, according to an embodiment. The method 700 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 700. In another embodiment, the charge to code converter 120 performs the method 700. Alternatively, other components of the electronic system 100 perform some or all of the operations of method 700.

In one embodiment, the method 700 describes the balancing of multiple integrating capacitors (e.g., first capacitor 321 and second capacitor 322). Method 700 shows two main "event tracks" applied to charge to code converter 120, illustrating the "ping-pong" method mentioned before. In block 705 of method 700, an input charge is received from a capacitive sense array 125. In block 710 of method 700, the input charge is attenuated at attenuator circuit 220 and transformed to an attenuated output charge. In block 715 of method 700, the first capacitor track begins by connecting the first capacitor 321 to attenuator circuit 220 and integrating the attenuated input signal. In block 720 of method 700, the second capacitor track starts in the opposite manner. The second capacitor 322 begins by being balanced by the current generator 333 while the first capacitor 321 is being integrated. In block 725 of method 700, the second capacitor 322 is disconnected from current generator 333 and either continues proceeding to block 735 or ends. In block 730 of method 700, the first capacitor 321 is disconnect from the attenuator output 312 and reconnected to the current generator 333. In block 735 of method 700, the second capacitor 322 is connected to the attenuator output 312 and integrates the attenuated input signal. In block 740 of method 700, the first capacitor 321 is charged or discharged by the current generator 333 and the charge balancing period is measured by the control unit 332. In block 745 of method 700, the second capacitor 322 is disconnected from the attenuator circuit 220. In one embodiment, the second capacitor 322 may continue the second capacitor track. In block 750 of method 700, the first capacitor 321 is disconnected from the current generator 333 and either continues the sampling and balancing operation or ends.

FIGS. 6 through 7 are flow diagrams illustrating methods for charge to code conversion. For simplicity of explanation, the methods are depicted and described as a series of acts. Although the operations of the methods herein are shown and described in a particular order, such order does not mean that such operations are necessarily performed in that order. Operations in accordance with this disclosure can occur in various orders and/or concurrently, and with other acts not presented and described herein. Certain operations may be performed, at least in part, concurrently with other operations and certain operations may be performed in an inverse order to that shown or described.

The methods described above regarding capacitance to code conversion can be implemented by the charge to code converter 120, which may be implemented in a capacitive touch screen controller. In one embodiment, the capacitive touch screen controller is the TrueTouch® capacitive touchscreen controller, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "supplying," "attenuating," "controlling," "converting," "accumulating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   coupling a first capacitor to an electrode of a capacitive sense array;
   integrating charge received from the electrode of the capacitance sense array with the first capacitor;
   decoupling the first capacitor from the electrode of the capacitive sense array;
   coupling a second capacitor to the electrode of the capacitive sense array;
   concurrently integrating charge received from the electrode of the capacitive sense array with the second capacitor and supplying a first balancing charge to the first capacitor;
   ceasing to supply the first balancing charge to the first capacitor when the charge on the first capacitor falls below a predetermined level; and
   calculating a first value representative of a capacitance of the electrode of the capacitive sense array based on a measure of the first balancing charge supplied to the first capacitor.

2. The method of claim 1 further comprising:
   decoupling the second capacitor from the electrode of the capacitive sense array;
   coupling the first capacitor to the electrode of the capacitive sense array;
   concurrently integrating charge received from the second electrode of the capacitive sense array with the first capacitor and supplying a second balancing charge to the second capacitor;
   ceasing to supply the second balancing charge to the second capacitor when the charge on the second capacitor falls below the predetermined level; and
   calculating a second value representative of a capacitance of the electrode of the capacitive sense array based on a measure of the second balancing charge supplied to the second capacitor.

3. The method of claim 2 further comprising:
   decoupling the first capacitor from the second electrode of the capacitive sense array;
   coupling the second capacitor to the electrode of the capacitive sense array;
   concurrently integrating charge received from the electrode of the capacitive sense array with the second capacitor and supplying a third balancing charge to the first capacitor;
   ceasing to supply the third balancing charge to the first capacitor when the charge on the first capacitor falls below the predetermined level; and
   calculating a third value representative of a capacitance of the electrode of the capacitive sense array based on a measure of the third balancing charge supplied to the first capacitor.

4. The method of claim 3 further comprising:
   calculating a fourth value representative of the capacitance of the electrode of the capacitive sense array based on the first and second values.

5. The method of claim 3 wherein supplying the third balancing charge to the first capacitor is based at least in part on an accumulated quantization error remaining from when the first balancing charge was supplied.

6. The method of claim 1 wherein coupling the first capacitor to the electrode of the capacitive sense array comprises coupling an attenuator between the first capacitor and the electrode of the capacitive sense array; and
   coupling the second capacitor to the electrode of the capacitive sense array comprises coupling the attenuator between the second capacitor and the second electrode of the capacitive sense array.

7. The method of claim 6 wherein coupling the attenuator between the first capacitor and the electrode of the capacitive sense array comprises coupling a programmable attenuator between the first capacitor and the electrode of the capacitive sense array.

8. The method of claim 1 wherein integrating charge received from the electrode of the capacitance sense array with the first capacitor comprises integrating charge from a rising edge of an excitation signal, and integrating charge received from the electrode of the capacitance sense array with the second capacitor comprises integrating charge from a falling edge of the excitation signal.

9. The method of claim 1 wherein supplying the first balancing charge to the second capacitor comprises coupling a current generator to the second capacitor.

10. An apparatus comprising:
    a capacitive sense array comprising a plurality of electrodes;
    a first convertor and a second convertor each selectively coupled to at least one of the plurality of sensing electrodes;
    a current generator selectively coupled to the first and second convertors; and
    a control unit coupled to the first and second convertors, the control unit configured to control the duration for which the current generator is coupled to each of the first and second controllers to balance charge of each of the first and second controllers, wherein the first convertor is configured to sample a signal representative of the capacitance of an electrode of the capacitive sense array while the second convertor is configured to balance a previously sampled charge to allow continuous integration of the input signal.

11. The apparatus of claim 10 further comprising an attenuator coupled between the at least one of the plurality of sensing electrodes and the first and second convertors.

12. The apparatus of claim 11 wherein the attenuator comprises a programmable attenuator.

13. The apparatus of claim 10 wherein the first and second convertors together comprise a single charge to code convertor comprising first and second capacitors, each selectively coupled to the at least one of the plurality of sensing electrodes, the control unit and the current generator.

14. The apparatus of claim 13 wherein the first and second capacitors each comprise a non-linear capacitor.

15. The apparatus of claim 14 wherein each non-linear capacitor comprises a MOS gate-oxide capacitance.

16. The apparatus of claim 10 wherein the first convertor is configured to integrate charge from a rising excitation signal applied to the capacitive sense array and the second convertor is configured to integrate charge from a falling excitation signal applied to the capacitive sense array.

17. A device comprising:
- a terminal configured to be coupled to an electrode of a capacitive sense array;
- a first capacitor and a second capacitor each configured to be selectively coupled to the terminal, and to operate as an integrator;
- a current generator configured to be selectively coupled to each of first and second capacitors; and
- a control unit configured to control the coupling of the first and second capacitors to the terminal and to the current generator and configured to balance charge on each of the first and second capacitors by controlling the current generator and the coupling of the current generator to each of the first and second capacitors.

18. The device of claim 17 further comprising an attenuator coupled between the terminal and the first and second capacitors.

19. The device of claim 17 wherein the first and second capacitors each comprise a non-linear capacitor.

20. The device of claim 17 wherein the second capacitor is configured to integrate charge concurrently with the current generator configured to balance charge on the first capacitor, and the first capacitor is configured to integrate charge concurrently with the current generator configured to balance charge on the second capacitor.

* * * * *